US008379990B2

(12) United States Patent  
Nitta

(10) Patent No.: US 8,379,990 B2  
(45) Date of Patent: Feb. 19, 2013

(54) OBJECT RECOGNITION APPARATUS, COMPUTER READABLE MEDIUM STORING OBJECT RECOGNITION PROGRAM, AND IMAGE RETRIEVAL SERVICE PROVIDING METHOD

(75) Inventor: Keiichi Nitta, Kawasaki (JP)

(73) Assignee: Nikon Corporation, Tokyo (JP)

( * ) Notice: Subject to any disclaimer, the term of this patent is extended or adjusted under 35 U.S.C. 154(b) by 1139 days.

(21) Appl. No.: 12/227,124

(22) PCT Filed: May 9, 2007

(86) PCT No.: PCT/JP2007/000494  
§ 371 (c)(1),  
(2), (4) Date: Nov. 7, 2008

(87) PCT Pub. No.: WO2007/129474  
PCT Pub. Date: Nov. 15, 2007

(65) Prior Publication Data  
US 2009/0129683 A1 May 21, 2009

(30) Foreign Application Priority Data

May 10, 2006 (JP) ................................. 2006-131308  
Sep. 6, 2006 (JP) ................................. 2006-242054

(51) Int. Cl.  
*G06K 9/68* (2006.01)  
*G06K 9/60* (2006.01)

(52) U.S. Cl. ........................................ 382/218; 382/305

(58) Field of Classification Search ........................ None  
See application file for complete search history.

(56) References Cited

U.S. PATENT DOCUMENTS

| 5,497,430 | A | * | 3/1996 | Sadovnik et al. | ............. | 382/156 |
| 5,631,970 | A | * | 5/1997 | Hsu | ............................... | 382/113 |
| 5,745,126 | A | * | 4/1998 | Jain et al. | ....................... | 382/154 |
| 5,799,100 | A | * | 8/1998 | Clarke et al. | .................. | 382/132 |
| 5,924,087 | A |   | 7/1999 | Takahashi et al. | | |
| 5,940,824 | A |   | 8/1999 | Takahashi | | |
| 5,963,653 | A | * | 10/1999 | McNary et al. | ............... | 382/103 |
| 6,029,195 | A | * | 2/2000 | Herz | .............................. | 725/116 |

(Continued)

FOREIGN PATENT DOCUMENTS

| JP | A-06-089316 | 3/1994 |
| JP | A-08-115334 | 5/1996 |

(Continued)

OTHER PUBLICATIONS

Office Action issued in corresponding Japanese Patent Application No. 2006131308 dated Dec. 21, 2010 (With Translation).

(Continued)

*Primary Examiner* — Manav Seth  
(74) *Attorney, Agent, or Firm* — Oliff & Berridge, PLC

(57) ABSTRACT

An object recognition apparatus includes an image input unit capturing image data, an object dictionary unit storing conditions to specify a type of an object, and a processor collating the image data with the conditions and specifying the type of the object imaged in the image data, in which the object dictionary unit classifies the conditions into hierarchies and stores the classified conditions, and the processor performs collation while narrowing down object conditions positioned in lower hierarchies based on a collation result of object conditions positioned in upper hierarchies.

11 Claims, 6 Drawing Sheets

U.S. PATENT DOCUMENTS

| | | | | |
|---|---|---|---|---|
| 6,038,337 A * | 3/2000 | Lawrence et al. | | 382/156 |
| 6,046,740 A * | 4/2000 | LaRoche et al. | | 715/764 |
| 6,137,908 A * | 10/2000 | Rhee | | 382/187 |
| 6,240,424 B1 * | 5/2001 | Hirata | | 707/749 |
| 6,266,442 B1 * | 7/2001 | Laumeyer et al. | | 382/190 |
| 6,269,358 B1 * | 7/2001 | Hirata | | 1/1 |
| 6,421,463 B1 * | 7/2002 | Poggio et al. | | 382/224 |
| 6,449,384 B2 * | 9/2002 | Laumeyer et al. | | 382/104 |
| 6,463,176 B1 * | 10/2002 | Matsugu et al. | | 382/195 |
| 6,625,315 B2 * | 9/2003 | Laumeyer et al. | | 382/190 |
| 6,801,662 B1 * | 10/2004 | Owechko et al. | | 382/224 |
| 6,906,719 B2 * | 6/2005 | Chadha et al. | | 345/473 |
| 7,092,548 B2 * | 8/2006 | Laumeyer et al. | | 382/104 |
| 7,444,003 B2 * | 10/2008 | Laumeyer et al. | | 382/103 |
| 7,593,574 B2 * | 9/2009 | Simard et al. | | 382/186 |
| 7,602,962 B2 * | 10/2009 | Miyamoto et al. | | 382/149 |
| 7,693,683 B2 * | 4/2010 | Ihara | | 702/179 |
| 8,180,161 B2 * | 5/2012 | Haseyama | | 382/224 |
| 2004/0076329 A1 | 4/2004 | Skarbek et al. | | |
| 2005/0213810 A1 | 9/2005 | Sabe et al. | | |
| 2005/0286767 A1 * | 12/2005 | Hager et al. | | 382/190 |
| 2007/0217676 A1 * | 9/2007 | Grauman et al. | | 382/170 |

FOREIGN PATENT DOCUMENTS

| | | |
|---|---|---|
| JP | A-08-305718 | 11/1996 |
| JP | A-08-335223 | 12/1996 |
| JP | A-09-044518 | 2/1997 |
| JP | A-2000-113097 | 4/2000 |
| JP | A 2002-063172 | 2/2002 |
| JP | A-2004-54957 | 2/2004 |
| JP | A-2004-070450 | 3/2004 |
| JP | A-2005-078529 | 3/2005 |
| JP | A-2005-284487 | 10/2005 |

OTHER PUBLICATIONS

Duda et al., "Nonmetric Methods," *Pattern Classification*, 2001, pp. 394-396, A Wiley-Interscience Publication, John Wiley & Sons, Inc.

Maillot et al., "Ontology based object learning and recognition: application to image retrieval," *Proceedings of the 16th IEEE International Conference on Tools with Artificial Intelligence*, 2004, The Computer Society.

Office Action issued in European Patent Application No. 07737150.8 dated Jun. 30, 2011.

Fan et al., "Mining Images on Semantics via Statistical Learning," Proceedings of the Eleventh ACM SIGKDD International Conference on Knowledge Discovery and Data Mining (KDD '05), Aug. 21, 2005, pp. 22-31.

Mezaris et al., "An Ontology Approach to Object-Based Image Retrieval," Proceedings 2003 International Conference on Image Processing, IEEE, vol. 2, Sep. 14, 2003, pp. 511-514.

Huang et al., "An Automatic Hierarchical Image Classification Scheme," Proceedings 6th ACM International Multimedia Conference, Sep. 12, 1998, pp. 219-228.

Vailaya et al., "Image Classification for Content-Based Indexing," IEEE Transactions on Image Processing, vol. 10, No. 1, Jan. 1, 2001, pp. 117-130.

Sauers et al., "On the Requirements of Future Expert Systems," Proceedings 8th Conference IJCAI, 1983, pp. 110-115.

Silva et al., "An Ontology-Based Approach for Visual Knowledge: Image Annotation and Interpretation," Human-Computer Studies Laboratory Workshop on Ontologies and Their Applications (WONTO 2004)—XVII Brazilian Symposium on Artificial Intelligence, Sep. 29, 2004.

Peng et al, "Automatic Web Page Classification in a Dynamic and Hierarchical Way," 2002 IEEE Proceedings on Data Mining, Dec. 9, 2002, pp. 386-393.

Klenner et al., "Concept Versioning: A Methodology for Tracking Evolutionary Concept Drift in Dynamic Concept Systems," ECAI 94, 11th European Conference on Artificial Intelligence, 1994, pp. 473-477.

Extended European Search Report issued in corresponding European Application No. 07737150.8, mailed Oct. 7, 2010.

* cited by examiner

US 8,379,990 B2

OBJECT RECOGNITION APPARATUS, COMPUTER READABLE MEDIUM STORING OBJECT RECOGNITION PROGRAM, AND IMAGE RETRIEVAL SERVICE PROVIDING METHOD

This application is a U.S. National Stage application claiming the benefit of prior filed International Application Number PCT/JP2007/000494, filed May 9, 2007, in which the International Application claims priorities from Japanese Application Numbers 2006-131308 (filed on May 10, 2006) and 2006-242054 (filed on Sep. 6, 2006), the entire contents of which are incorporated herein by reference.

TECHNICAL FIELD

The present invention relates to an object recognition apparatus, a computer readable medium storing object recognition program, and an image retrieval service providing method.

BACKGROUND ART

Conventionally, there has been known a technology to recognize a face part imaged in image data such as a face-recognition technology.

Patent document 1 described below also discloses an apparatus recognizing the object in the image data and displaying information of an object together with the image data.

Meanwhile, a retrieval site on the Internet or the like provides an image retrieval service by performing a keyword retrieval of text information (image file name, shooting date-and-time information, etc.) accompanying the image data.

Patent Document 1: Japanese Unexamined Patent Application Publication No. 2000-113097.

DISCLOSURE

Problem to be Solved

As the above described face-recognition technology, the technology to recognize an object in image data has been progressing from day to day and it is presumed that types of objects to be recognized will increase over the future along with the progress.

Meanwhile, Patent document 1 needs to perform the object recognition one by one for each of the object types. Therefore, when the number of object types to be recognized becomes large, the number of processing times for the object recognition increases considerably and the total processing time for the object recognition becomes long.

Accordingly, it is a proposition of the present invention to provide a technique to perform object recognition of image data efficiently.

Means for Solving the Problem

An object recognition apparatus according to a first invention is provided with an image input unit, an object dictionary unit, and a processor. The image input unit captures the image data. The object dictionary unit stores a condition for specifying a type of an object. The processor collates the image data with the conditions, and specifies the type of the object imaged in the image data. In particular, in the first invention, the object dictionary unit classifies the conditions into hierarchies and stores the classified conditions. The processor performs collation of the image data with the object conditions of the lower hierarchies, while narrowing down the object conditions positioned in lower hierarchies based on a collation result of the object condition positioned in an upper hierarchy with the image data.

In a second invention according to the first invention, the processor makes predetermined keyword information related to the recognized type of the object correspond to the image data and records the predetermined keyword information. Further, the processor performs image retrieval by collating an input keyword with this keyword information.

In a third invention according to any one of the first and the second invention, the object dictionary unit has a function to perform additional registration of the object type Kd and the object condition Cd. The processor finds the object type Ku, which includes the object type Kd, in the upper hierarchy in accordance with this additional registration, and additionally performs collation of the image data, in which the object type Ku has been detected, with the object condition Cd.

In a fourth invention according to any one of the first to the third inventions, the dictionary unit has a function to manage version information of the conditions. The processor makes the version information of the conditions used to specify the type of the object correspond to the image data and records the version information.

An object recognition apparatus according to a fifth invention is provided with an image input unit, an object dictionary unit, and a processor. The image input unit captures image data. The object dictionary unit stores conditions for specifying a type of an object in accordance with a hierarchical structure of the type of the object. The processor specifies the type of the object imaged in the image data upon collating the image data with the conditions. Meanwhile, the object dictionary unit has a function to perform additional registration of the object type Ku as the upper hierarchy of the registered object type Kd. The processor assumes the image data in which object type Kd has been detected as the image data in which object type Ku has been detected and classifies the image data in which object type Kd has been detected, according to this additional registration.

In a sixth invention according to the fifth invention, the object dictionary unit has a function to perform the additional registration of the plurality of detected types of the objects as the object type Ku in the upper hierarchies. The processor, in accordance with this additional registration, finds a sum of sets of the image data whose plurality of types of the objects have been detected, assumes the image data in which the plurality of types of the objects have been detected as the image data in which the object type Ku has been detected and classifies the image data in which the plurality of types of the objects have been detected.

In a seventh invention according to any one of the fifth and sixth invention, the object dictionary has a function to manage version information of the condition. The processor makes the version information correspond to the image data which is assumed as the object type Ku and records the version information.

A computer readable medium storing object recognition program according to an eighth invention is a program for causing a computer to function as an object recognition apparatus according to any one of the first to seventh inventions.

An image retrieval service providing method according to a ninth invention is a method for causing a computer to perform an image retrieval service, including the steps of:
(1) classifying conditions to specify a type of an object into hierarchies and storing the classified conditions;
(2) finding the type of the object imaged in an image data upon collating the image data with the conditions sequentially in accordance with the hierarchies;

(3) making predetermined keyword information related to the recognized type of the object correspond to the image data and recording the predetermined keyword information; and
(4) performing image retrieval and collating an input keyword with the keyword information corresponding to the image data.

An image retrieval service providing method according to a tenth invention is a method for causing a computer to perform an image retrieval service, including the steps of:
(1) classifying conditions to specify a type of an object into a hierarchical structure and storing the classified conditions;
(2) finding the type of the object imaged in an image data upon collating the image data with the conditions sequentially in accordance with the hierarchies;
(3) assuming the image data in which an object type Kd has been detected to be the image data in which an object type Ku has been detected, after accepting additional registration of the object type Ku as a hierarchy upper than that of the registered object type Kd;
(4) making predetermined keyword information related to the recognized type of the object correspond to the image data and recording the predetermined keyword information; and
(5) performing image retrieval and collating an input keyword with the keyword information corresponding to the image data.

DETAILED DESCRIPTION OF THE EMBODIMENTS

Explanation of a First Embodiment

Figure 1:
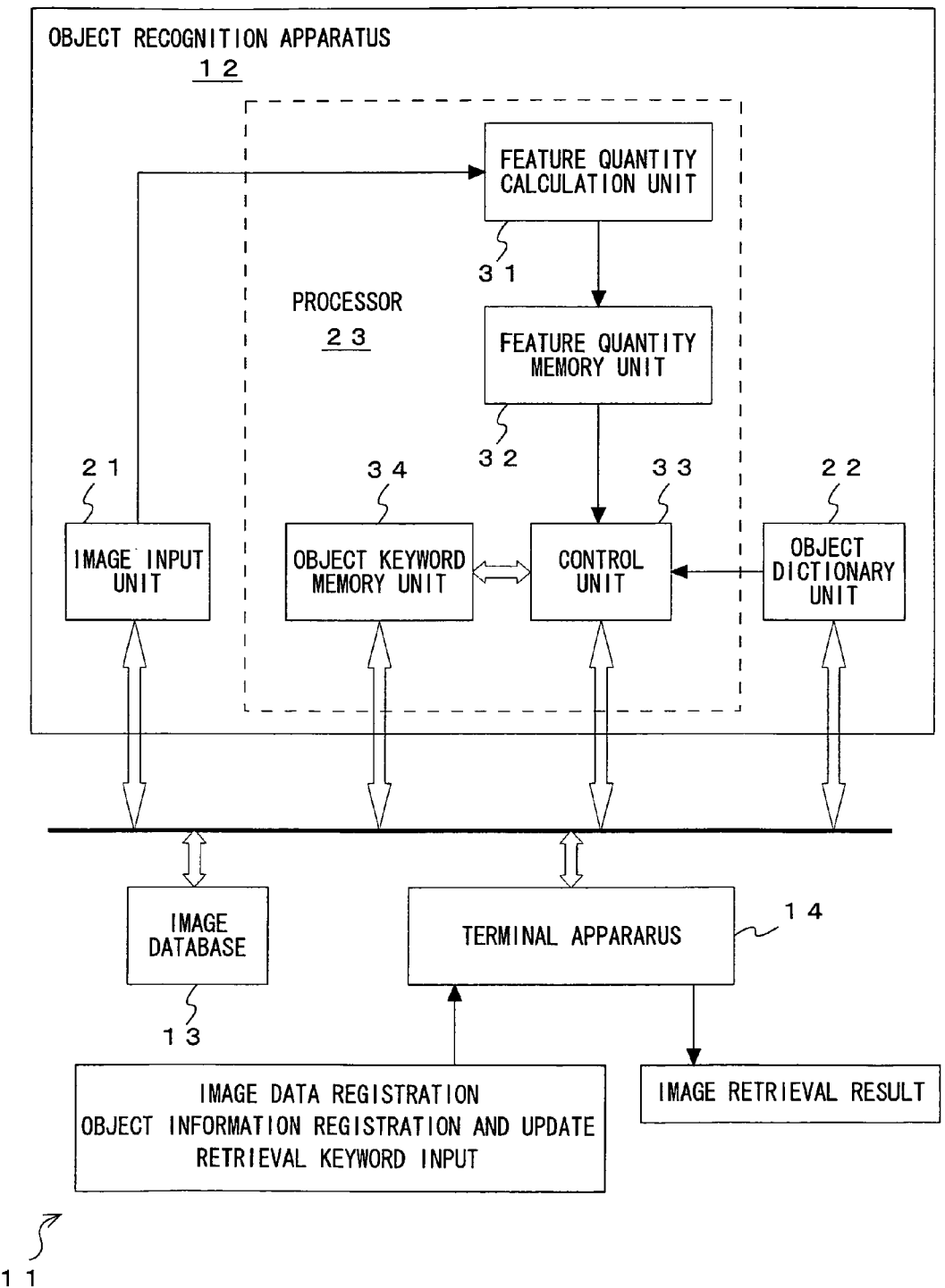
FIG. 1 is a block diagram showing a configuration of an image retrieval system.

FIG. 1 is a block diagram showing a configuration of an image retrieval system 11.

In FIG. 1, the image retrieval system 11 is configured by communication-connecting an object recognition apparatus 12, an image database 13, and a terminal apparatus 14 (user's personal computer or the like) via a communication line such as the Internet.

Meanwhile, a system performing a high-speed retrieval of image data stored in the computer may be built by realizing this image retrieval system 11 by a single computer.

Further, the object recognition apparatus 12 is configured by providing an image input unit 21, an object dictionary unit 22, and a processor 23. Moreover, this processor 23 is configured by providing a feature quantity calculation unit 31, a feature quantity memory unit 32, a control unit 33, and an object keyword memory unit 34.

Meanwhile, a part of or the whole of such an object recognition apparatus 12 may be realized in a software manner by executing an object recognition program on a computer. Additionally, a part of or the whole of the object recognition apparatus 12 may be realized in a hardware manner.

Hereinafter, operation of the image retrieval system 11 will be described specifically.

(Object Recognition for a New Image)

Figure 2:
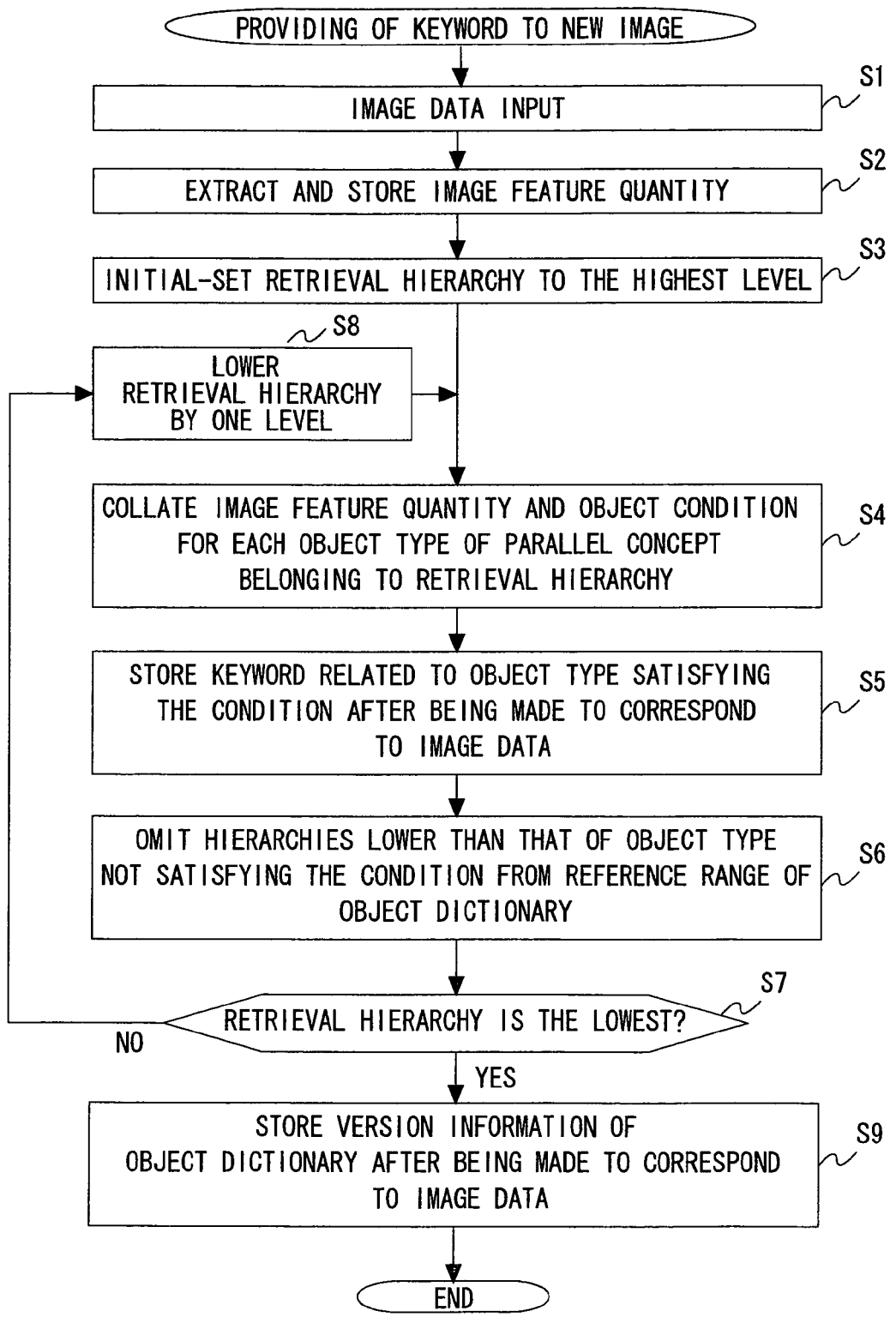
FIG. 2 is a flowchart explaining object recognition for new image data.

FIG. 2 is a flowchart explaining object recognition for new image data. In the following, the operation will be explained according to the step number shown in this FIG. 2.

Step S1: The image input unit 21 periodically monitors data update in the image database 13. When the image input unit 21 finds new image data, which has not been provided with a keyword yet, in the image database 13 by this monitoring, the image input unit 21 captures this image data.

Step S2: The feature quantity calculation unit 31 extracts an image feature quantity from the captured image data for performing the object recognition efficiently. This image feature quantity is used for collation with object conditions described later. The extracted image feature quantity is stored in the feature quantity memory unit 32.

The following data is effective for this kind of image feature quantity, for example.

(1) Hue histogram of an image . . . used for recognizing an object of a landscape object and an object of a person by color tendency thereof.

(2) Extracted edge of an image . . . used for recognizing a specific object based on an edge shape.

(3) Region whose contour shows a closed-curve . . . used for recognizing a closed region such as a face and an object.

(4) Partial image of a face (skin color) . . . used for recognizing a specific person.

(5) Color around lips . . . used for recognizing a man or a woman.

(6) Color around hairs . . . used for recognizing a man, a woman, or an aged person.

(7) Texture of an image . . . used for recognizing an eye, a nose, a mouth, a cloth pattern, a field of grass, a lignosa, etc.

(8) Vertical line frequency . . . used for recognizing a building, a lignosa, etc.

(9) Horizontal line across a screen . . . used for recognizing a sea horizon, a skyline, etc.

(10) Estimated color temperature of a light source . . . used for recognizing indoor, outdoor, etc.

(11) Partial image of image data . . . used for pattern matching.

(12) Accompanying information such as GPS information, imaging date-and-time, an object distance, exposure information, voice data, information indicating vertical and horizontal direction of an image, focus control information.

Figure 3:
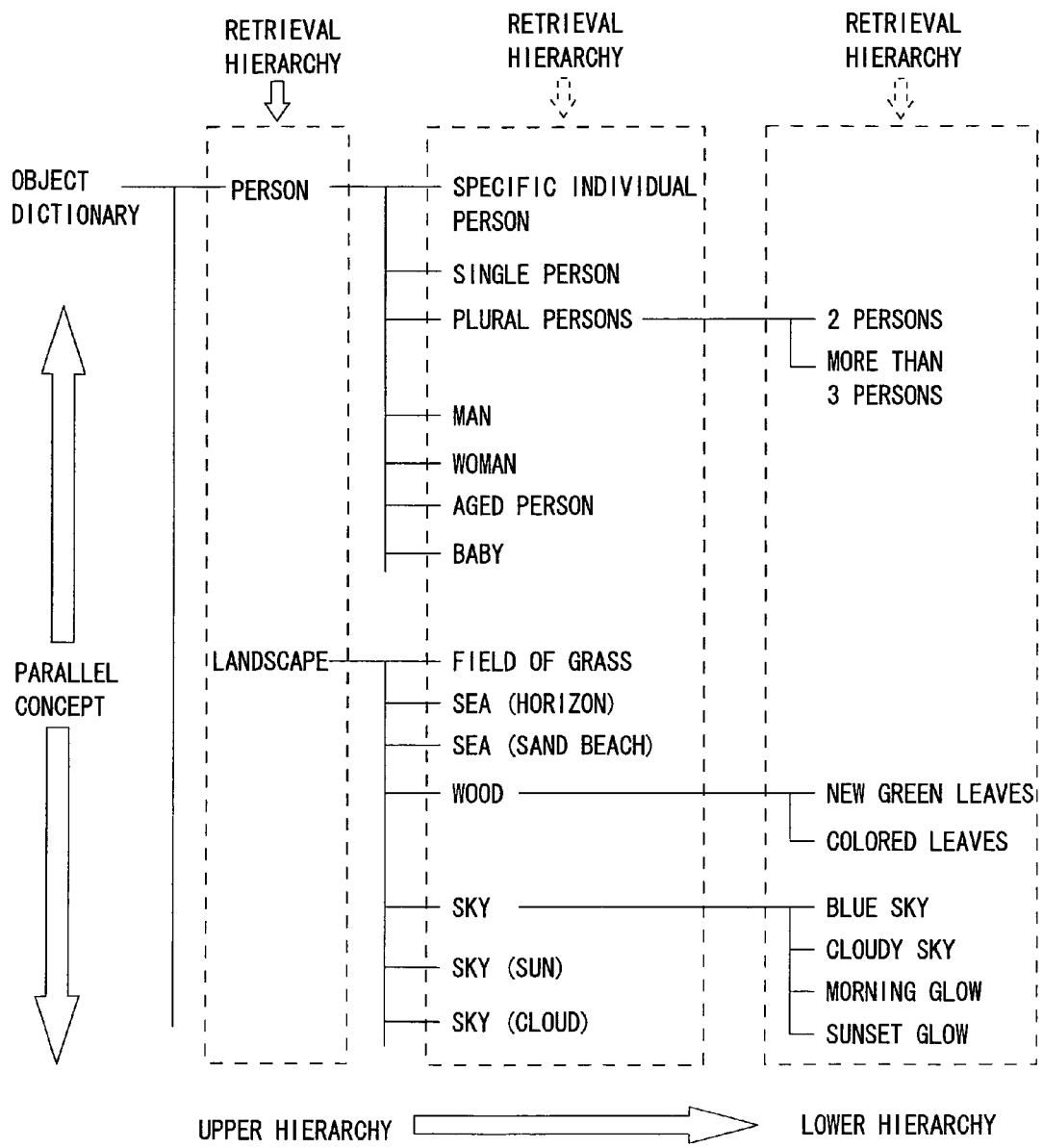
FIG. 3 is a diagram showing an example of a hierarchical structure of an object dictionary.

Step S3: An object dictionary in the object dictionary unit 22 preliminarily registers object conditions for specifying an object type in a hierarchical structure as shown in FIG. 3. The control unit 33 selects the highest hierarchy from among the hierarchical structures in this object dictionary taken as a retrieval hierarchy.

Step S4: The control unit 33 reads out the object conditions one by one, which belong to the retrieval hierarchy, from the object dictionary unit 22, and collates the object condition with the image feature quantity one by one.

For example, in FIG. 3, in the highest retrieval hierarchy, the object types which have parallel concepts (having the same depth from the highest hierarchy) as a person and a landscape are defined.

For example, if the object condition for a person is satisfied as being such that a high frequency distribution of skin color appears in the hue histogram, it is determined that an object of a person is imaged in the image data.

Further, if the object condition for a landscape is satisfied as being such that a high frequency distribution of blue or green appears in the hue histogram and an object distance is long, it is determined that an object of a landscape is imaged in the image data.

Based on the operation described above, on each of the object types of the parallel concepts belonging to the retrieval hierarchy, a condition judgment whether or not each of the object types thereof is imaged in the image data is performed.

Step S5: The control unit 33 records a keyword related to the object type, which satisfies the condition, into the object keyword memory unit 34 after being made to correspond to the image data.

Step S6: The control unit 33 omits lower hierarchies included in the object type which does not satisfy the condition, from a reference range of the object dictionary. For example, when the object condition for a person has not been satisfied, the lower hierarchies (specific person, man, woman, etc. in FIG. 3) included in the object of a person are omitted from the reference range of the object dictionary. By limiting the reference range of the object dictionary according to the object recognition result in the upper hierarchy in this manner, it is possible to perform the object recognition efficiently while narrowing down the object types which have high possibilities.

Step S7: Here, the control unit 33 determines whether or not the retrieval hierarchy of the object dictionary reaches the lowest hierarchy.

When the lower hierarchies remain below the retrieval hierarchy, the control unit 33 shifts the operation to Step S8 for performing the object recognition in these lower hierarchies.

On the other hand, when the retrieval hierarchy has already reached the lowest hierarchy, the control unit 33 assumes to have completed the whole object recognition for the new image data, and shifts the operation to Step S9.

Step S8: The control unit 33 lowers the retrieval hierarchy by one level and returns the operation to Step S4.

Step S9: The control unit 33 obtains version information of the object dictionary from the object dictionary unit 22, and records the version information into the object keyword memory unit 34 after being made to correspond to the image data.

According to the above operation, completed is the processing of the object recognition and the keyword providing for the image data which has not been provided with the keyword.

(Processing Accompanied with Update of the Object Dictionary)

Figure 4:
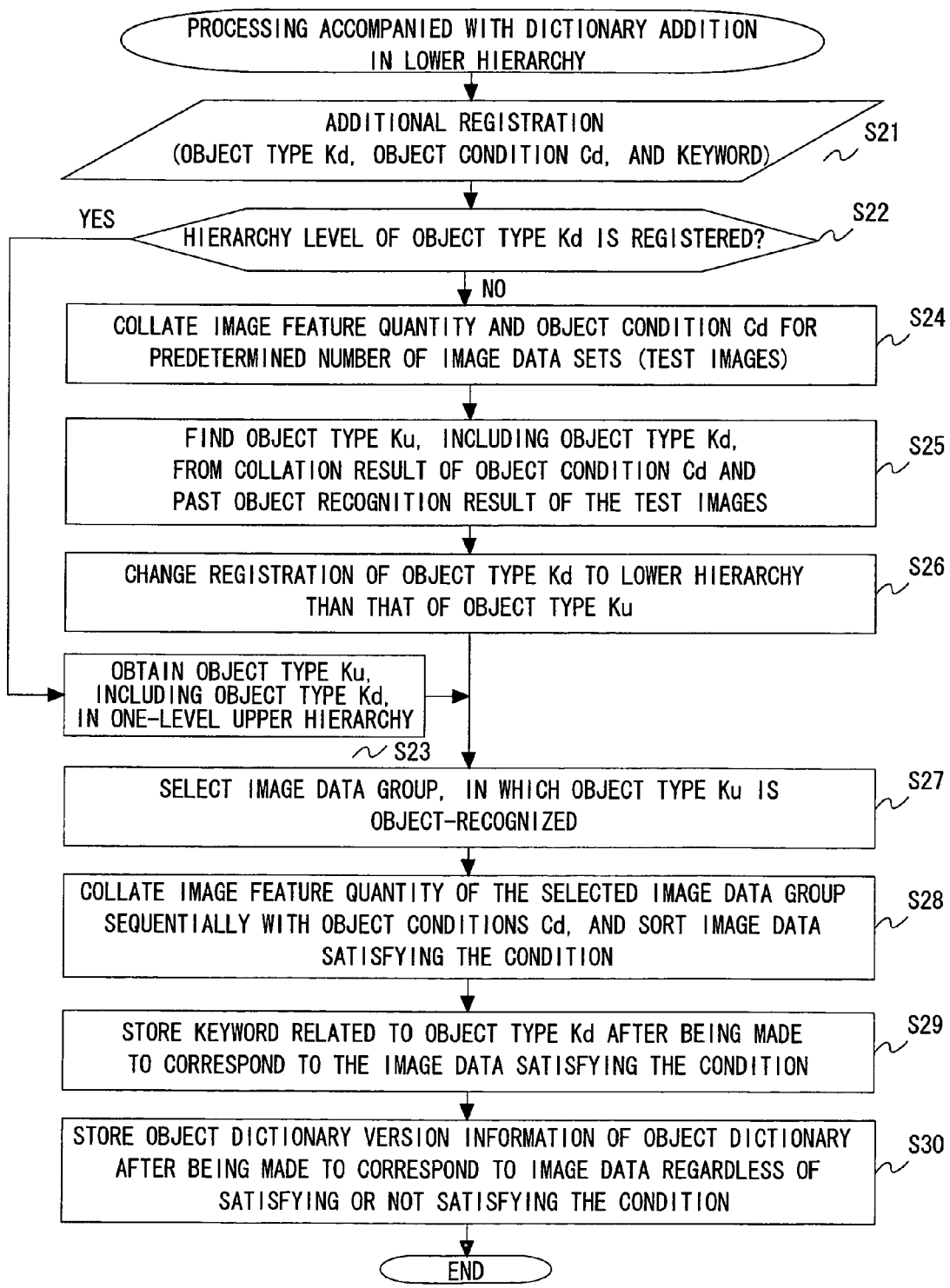
FIG. 4 is a flowchart explaining processing accompanied with dictionary update.

FIG. 4 is a flowchart explaining processing accompanied with dictionary addition. In the following, the operation will be described along the step number shown in FIG. 4.

Step S21: the object dictionary unit 22 has a function to perform additional registration of the following items to the object dictionary.
 (1) Object type Kd
 (2) Object condition Cd for specifying the object type Kd
 (3) Keyword related to the object type Kd
 (4) Hierarchy level of the object type Kd in the object dictionary A user can customize the object dictionary by performing the additional registration of these items via the terminal apparatus 14. Further, an administrator side of the image retrieval system 11 can also perform version upgrade of the object dictionary periodically by implementing this additional registration.

Meanwhile, the registration of the hierarchy level may be omitted because the knowledge of the hierarchical structure of the object dictionary becomes necessitated. Additionally, it is possible to perform registration of the object condition Cd simply by registering a part of or the whole of a representative image corresponding to the object type Kd.

On the other hand, the object dictionary unit 22 side stores the update contents of the object dictionary as a history and updates the version information which indicates an edition number of the object dictionary, every time such additional registration has been performed.

Step S22: The control unit 33 judges whether or not the hierarchy level has been registered additionally with respect to the object type Kd.

Here, when the registration of the hierarchy level is omitted, the control unit 33 shifts the operation to Step S24 for examining the hierarchy level of the object type Kd.

On the other hand, when the hierarchy level of the object type Kd has been registered, the control unit 33 shifts the operation to Step S23.

Step S23: The control unit 33 finds the object type Ku, which includes the object type Kd, in the upper hierarchy by one level in accordance with the registered hierarchy level. After this operation, the control unit 33 shifts the operation to Step S27.

Step S24: The control unit 33 first performs the object recognition on trial, since the hierarchy level of the object type Kd is unknown. That is, the control unit 33 performs a series of collation processing of the image feature quantities with the object conditions Cd with respect to a predetermined number of image data sets (test images) which had finished the object recognition in the past.

Step S25: The control unit 33 finds the object type Ku, which includes the object type Kd logically, based on the collation result in Step S24 and the past object recognition result of the test images.

Step S26: The control unit 33 rewrites the object dictionary in the object dictionary unit 22 and makes the hierarchy level of the object type Kd lower than that of the object type Ku.

Step S27: The control unit 33 selects an image data group, in which the object type Ku was determined to be imaged by the past object recognition.

Step S28: The control unit 33 collates the image feature quantity of the image data group selected in Step S27 sequentially with the object conditions Cd, and sorts out the image data which satisfies the conditions.

Step S29: The control unit 33 records the keyword related to the object type Kd into the object keyword memory unit 24 after being made to correspond to the image data which satisfies the condition in Step S28.

Step S30: The control unit 33 obtains the version information of the object dictionary from the object dictionary unit 22, and records the version information into the object keyword memory unit 34 after being made to correspond to the image data selected in Step S27.

Based on the above described operations, it is possible to provide a new object keyword additionally to the image data according to the update of the object dictionary.

(Image Retrieval Operation)

Figure 5:
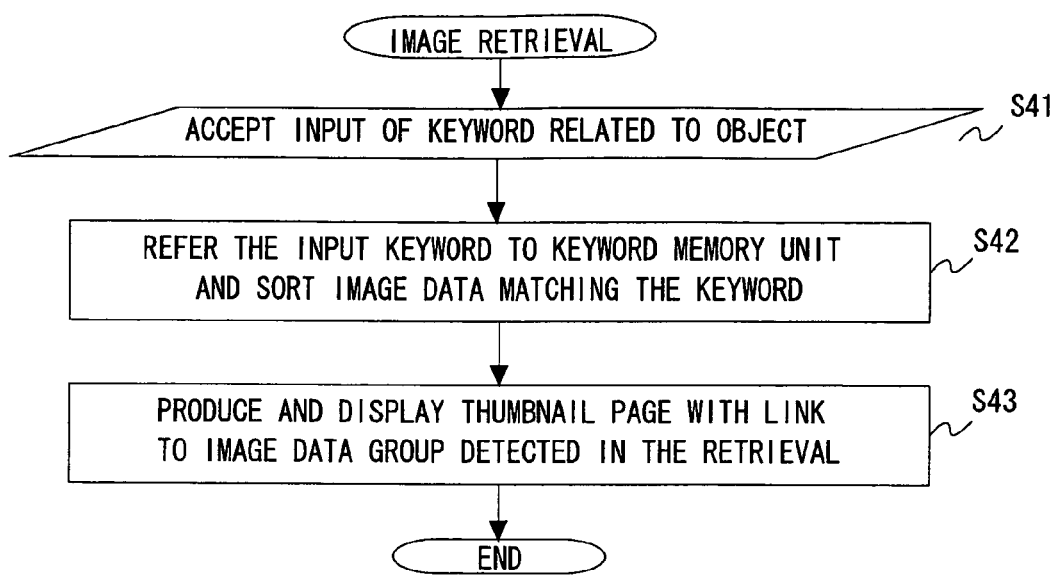
FIG. 5 is a flowchart explaining image retrieval operation.

FIG. 5 is a flowchart explaining the image retrieval in the present embodiment. In the following, this operation will be described along the step number shown in FIG. 5.

Step S41: The user inputs a keyword related to the object into the terminal unit 14 to retrieve the image data, in which a desired object is imaged. The terminal unit 14 transmits this input keyword to the control unit 33.

Step S42: The control unit 33 refers the input keyword to the object keyword memory unit 34, and sorts out the image data which matches or is similar to the input keyword.

Step S43: The control unit 33 produces a thumbnail page with a link after arranging thumbnails of the image data sorted out in Step 42. The control unit 33 transfers the produced thumbnail page data to the terminal apparatus 14 as an image retrieval result. The user can access the image data being the result of the retrieval upon browsing this thumbnail page using the terminal apparatus 14 and following the thumbnail page link.

By this operation, it becomes possible to retrieve the image data, in which the object type related to the input keyword is imaged, quickly from the image data group.

In the following, effects of the object recognition apparatus in the first embodiment will be described. Since using the object dictionary having the hierarchical structure for the image retrieval, it is possible to perform the object recognition so as to narrowing down the object types. Therefore, it is possible to omit the object recognition in the lower hierarchies, which have less possibility, flexibly in accordance with a recognition status in the upper hierarchy. As a result, it is possible efficiently to reduce the number of times of the object recognition and to shorten the total processing time required for the object recognition, even when the object types to be recognized increase.

Additionally, the object recognition apparatus recognizes preliminarily the object type which is imaged in the image data, and records the keyword related to the object type. Therefore, it becomes possible easily to retrieve the image data, in which a desired object is imaged, by the keyword collation.

Further, the object recognition apparatus narrows the collation range of the additionally registered object type Kd into the image data group which was classified into the object type Ku of the upper hierarchy in the past. As a result, it is not necessary to perform the object recognition again for the whole image data in the past every time the additional registration is performed, and it is possible to reduce a processing load accompanied with the version upgrade of the object dictionary.

Although the first embodiment describes the case of performing the additional registration of the object type Kd in the lower hierarchy as the update of the object dictionary, it is possible additionally to register the object type Ku in the upper hierarchy too, in addition to the additional registration of the object type Kd in the lower hierarchy. In the following, an embodiment of this case will be described as a second embodiment. A configuration of an image retrieval system and additional registration of the object type Kd in the lower hierarchy in the second embodiment are the same as those in the first embodiment, and repeated explanation will be omitted and only processing in the additional registration of the object type Ku in the upper hierarchy will be described.

Explanation of Second Embodiment (Processing Accompanied with Dictionary Addition in the Upper Hierarchy)

Figure 6:
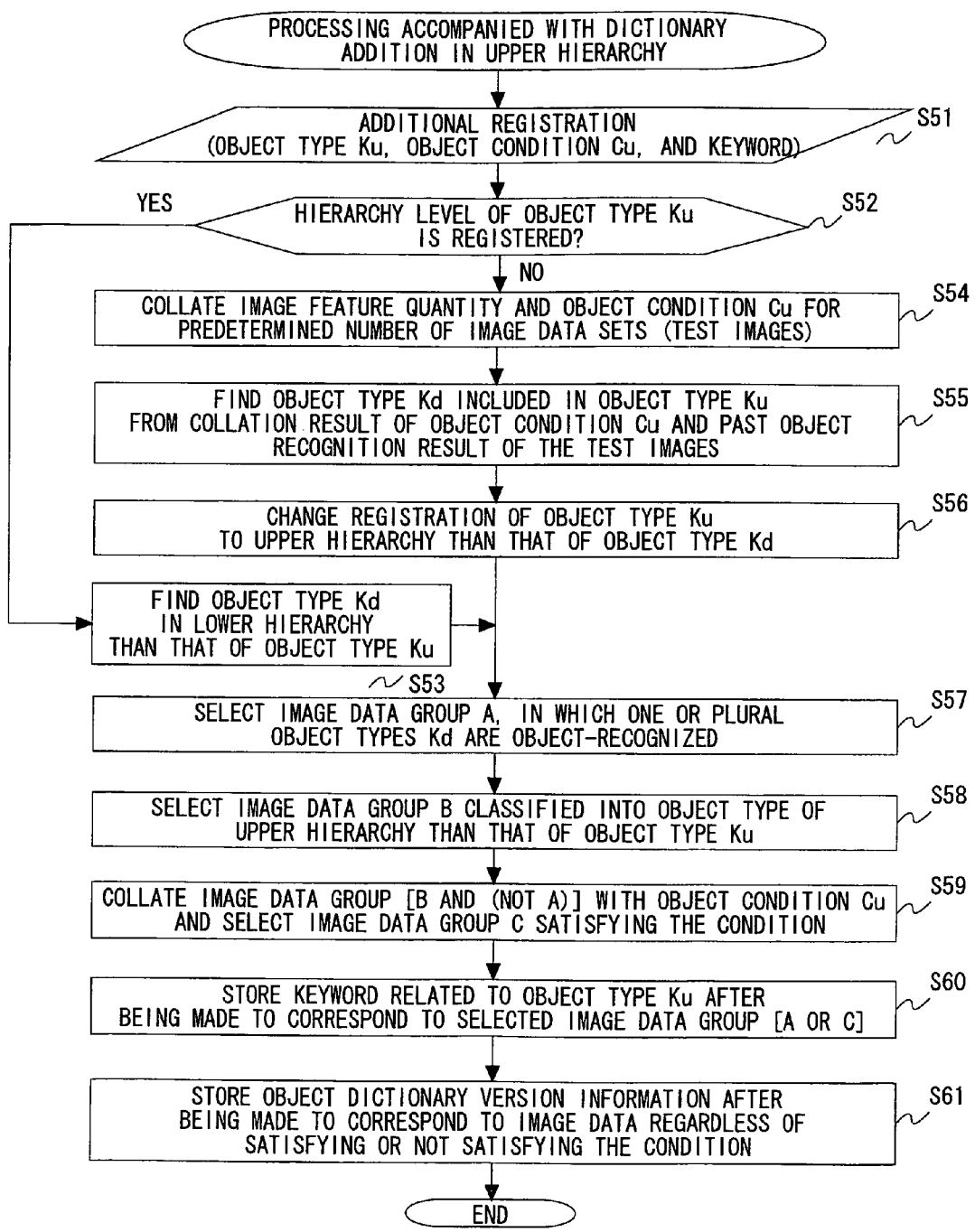
FIG. 6 is a flowchart explaining processing accompanied with a dictionary addition in an upper hierarchy.

FIG. 6 is a flowchart explaining processing accompanied with the dictionary addition in the upper hierarchy. In the following, the operation will be described along the step number shown in FIG. 6.

Step S51: The object dictionary unit 22 has a function to perform the additional registration of the following items into the object dictionary.
(1) Object type Ku
(2) Object condition Cu for specifying the object type Ku
(3) Keyword related to the object type Ku
(4) Hierarchy level of the object type Ku in the object dictionary The user can customize the object dictionary by performing the additional registration of these items via the terminal apparatus 14. Additionally, the administrator side of the image retrieval system 11 can perform version upgrade of the object dictionary periodically by performing this additional registration.

Meanwhile, the registration of the hierarchy level may be omitted because the knowledge of the hierarchical structure of the object dictionary becomes necessitated. Additionally, it is possible to perform registration of the object condition Cu simply by registering a part of or the whole of a representative image corresponding to the object type Ku.

On the other hand, the object dictionary unit 22 side stores the update contents of the object dictionary as a history and updates the version information which indicates an edition number of the object dictionary, every time such additional registration has been performed.

Step S52: The control unit 33 judges whether or not the hierarchy level has been registered additionally with respect to the object type Ku.

Here, when the registration of the hierarchy level is omitted, the control unit 33 shifts the operation to Step S54 for examining the hierarchy level of the object type Ku.

On the other hand, when the hierarchy level of the object type Ku has been registered, the control unit 33 shifts the operation to Step S53.

Step S53: The control unit 33 finds an object type Kd in the hierarchy which is one level lower than that of the object type Ku in accordance with the registered hierarchy. In this case, the number of the object types Kd may be single or plural. After this operation, the control unit 33 shifts the operation to Step S57.

Step S54: The control unit 33 first performs the object recognition on trial, since the hierarchy level of the object type Ku is unknown. That is, the control unit 33 performs a series of collation processing of the image feature quantities with the object conditions Cu with respect to a predetermined number of image data sets (test images) which had finished the object recognition in the past.

Step S55: The control unit 33 finds the object type Kd included in the object type Ku logically, based on the collation result in Step S54 and the past object recognition result of the test images. In this case, the number of the object types Kd is single or plural.

Step S56: The control unit 33 rewrites the object dictionary in the object dictionary unit 22 and makes the hierarchy level of the object type Ku upper than that of the object type Kd.

Step S57: The control unit 33 selects image data group A, in which the object type Kd is determined to be imaged by the past object recognition. Meanwhile, when the object type Kd in the lower hierarchy exists in plural numbers, the control unit 33 finds an image data group for each of the object types Kd and finds a sum of sets of these image data groups to set it to the image data group A.

Step S58: The control unit 33 finds the object type corresponding to the hierarchy which is upper than that of the object type Ku and selects the image data group B classified into the object type in this upper hierarchy, by the same processing as that of Steps 22 to 25 described above. Meanwhile, when the upper hierarchy of the object type Ku does not exist, after selecting the image data group, which is determined to necessitate the object recognition as described later, the selected image data group may be taken to as the image data group B.

(1) Whole image data in the image database 13

(2) New image data registered in the last several months (3) Image data hit by the past image retrieval in more frequent times than a threshold value (4) Image data browsed in the past in more frequent times than a threshold value Step S59: The control unit 33 obtains the image data group [B and (not A)] by removing one corresponding to the image data group A from among the image data group B.

The control unit 33 selects the image data group C which satisfies the conditions, after collating this image data group [B and (not A)] sequentially with the object conditions Cu.

Step S60: The control unit 33 finds a sum of sets of the image data group A selected in Step S57 and the image data group C selected in Step S59, and obtain the image data group [A or C]. The control unit 33 records the keyword related to the object type Ku into the object keyword memory unit 24 after being made to correspond to the image data belonging to this image data group [A or C].

Step 61: The control unit 33 captures the version information of the object dictionary from the object dictionary unit 22 and records the version information into the object keyword memory unit 34 after being made to correspond to the image group B (or image data group [A or C]).

By the above operation, it is possible to provide the new object keyword additionally to the image data in accordance with the dictionary addition of the object type Ku in the upper hierarchy.

The second embodiment limits the collation range of the object type Ku additionally registered in the upper hierarchy to the image data group [B and (not A)] found in Step S59. As a result, it is not necessary to perform the object recognition again for the whole image data in the past every time the additional registration is performed, and it is possible to reduce the processing load accompanied with the version upgrade of the object dictionary.

Further, when performing the additional registration of the object type Ku in the upper hierarchy, the second embodiment provides the object keyword after assuming the image data group A of the object type Kd in the lower hierarchy to be the object type Ku. Therefore, it is not necessary to perform the object recognition repeatedly for the image data group A and it is possible to reduce the processing load accompanied with the version upgrade of the object dictionary.

(Supplementary Items for the Embodiments)

(1) The above embodiments are described mainly for the application of the image retrieval. However, the embodiments are not limited to this application. For example, by discriminating the object types imaged in the image data, it may be possible to provide the image processing (including image quality adjustment) corresponding to the object type for the image data. Based on this operation, it is possible to realize an image processing apparatus which can select and perform image processing suitable for the object type.

(2) The above described embodiments extract the image feature quantity from the image data. However, the present embodiments are not limited to this method. It may be judged whether or not the object type is imaged in the image data, by collating a template image representing the object type (corresponding to the object condition) with the image data using pattern matching.

(3) The above described embodiments may divide the image data into a plurality of divided regions and may perform the object recognition for each of the divided regions.

(4) The above described embodiments narrow down the object types based on the inclusive relation of upper and lower hierarchies to reduce the number of times of the object recognition. However, the present embodiments are not limited to this method.

For example, when the object recognition is performed for a person and a woman, the object judged to be a person and not a woman is capable of being classified into a man or the like directly. In this manner, it is possible to reduce the number of times of the object recognition efficiently by narrowing down the possibilities of the object types based on an exclusive relation of the parallel concepts.

(5) The above described embodiments record the keyword and version information of the image data into the object keyword memory unit 34. However, the embodiments are not limited to this method. It may be possible to record the keyword information and/or the version information into an image data file (e.g., EXIF data).

(6) The above embodiments are described on the assumption of a still image, but are not limited to this application. The embodiments can be applied also to a moving image in the same manner. For example, it is possible to discriminate a scene imaging persons in one moving image file and further it is possible to discriminate a scene imaging women in the scene imaging persons.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An object recognition apparatus comprising:
an image input unit capturing image data;
an object dictionary unit storing conditions to specify a type of an object; and
a processor collating the image data with the conditions and specifying the type of the object imaged in the image data, wherein
the object dictionary unit classifies the conditions into hierarchies and stores the classified conditions, and
the processor performs collation while narrowing down object conditions positioned in lower hierarchies based on a collation result of object conditions positioned in upper hierarchies.

2. The object recognition apparatus according to claim 1, wherein
the processor
makes predetermined keyword information related to the recognized type of the object correspond to the image data and records the predetermined keyword information, and
performs image retrieval by collating an input keyword with the keyword information corresponding to the image data.

3. The object recognition apparatus according to claim 1, wherein
the object dictionary unit has a function to perform additional registrations of an object type Kd and an object condition Cd, and
the processor finds an object type Ku, which includes the object type Kd, in the upper hierarchy according to the additional registration by the object dictionary unit, and additionally performs collation of the image data, in which the object type Ku has been detected, with the object condition Cd.

4. The object recognition apparatus according to claim 1, wherein
the object dictionary unit has a function to manage version information of the conditions, and
the processor makes the version information of the conditions used to specify the type of the object correspond to the image data and records the version information.

5. An object recognition apparatus, comprising:
an image input unit capturing image data;
an object dictionary unit storing conditions to specify a type of an object in accordance with a hierarchical structure of the type of the object; and
a processor collating the image data with the conditions and specifying the type of the object imaged in the image data, wherein
the object dictionary unit has a function to perform additional registration of an object type Ku as a hierarchy upper than that of a registered object type Kd, and
the processor assumes the image data in which the object type Kd has been detected as the image data in which the object type Ku has been detected and classifies the image data in which the object type Kd has been detected, according to the additional registration.

6. The object recognition apparatus according to claim 5, wherein
the object dictionary unit has a function to perform additional registration of the plurality of detected types of the objects as the object type Ku in upper hierarchies, and
the processor finds a sum of sets of the image data in which the plurality of types of the objects have been detected, assumes the image data in which the plurality of types of the objects have been detected as the image data in which the object type Ku has been detected, and classifies the image data in which the plurality of types of the objects have been detected, according to the additional registration.

7. The object recognition apparatus according to claim 5, wherein
the object dictionary unit has a function to manage version information of the conditions, and
the processor makes the version information after the additional registration correspond to the image data which is assumed to be the object type Ku and records the version information.

8. A non-transitory computer readable medium storing an object recognition program which causes a computer to function to perform an object recognition process, comprising:
capturing image data;
classifying conditions to specify a type of an object into hierarchies and storing the classified conditions; and
finding the type of the object imaged in the image data by narrowing down object conditions positioned in lower hierarchies based on a result of collating the image data with object conditions positioned in upper hierarchies of the classified conditions.

9. An image retrieval service providing method for causing a computer to perform an image retrieval service, comprising:
classifying conditions to specify a type of an object into hierarchies and storing the classified conditions;
finding the type of the object imaged in the image data upon collating the image data with the conditions sequentially in accordance with the hierarchies;
making predetermined keyword information related to the recognized type of the object correspond to the image data and recording the predetermined keyword information; and
performing image retrieval and collating an input keyword with the keyword information corresponding to the image data.

10. An image retrieval service providing method for causing a computer to perform an image retrieval service, comprising:
classifying conditions to specify a type of an object into hierarchies and storing the classified conditions;
finding the type of the object imaged in the image data upon collating the image data with the conditions sequentially in accordance with the hierarchies;
assuming the image data in which an object type Kd has been detected to be the image data in which an object type Ku has been detected, after accepting additional registration of the object type Ku as a hierarchy upper than that of the registered object type Kd;
making predetermined keyword information related to the recognized type of the object correspond to the image data and recording the predetermined keyword information; and
performing image retrieval and collating an input keyword with the keyword information corresponding to the image data.

11. An image retrieval service providing method for causing a computer to perform an image retrieval service, comprising:
classifying conditions to specify a type of an object into hierarchies and storing the classical conditions;
finding the type of the object imaged in the image data by narrowing down object conditions positioned in lower hierarchies based on a result of collating the image data with object conditions positioned in upper hierarchies of the classified conditions; and
finding an object type Ku, which includes an object type Kd, in the upper hierarchy, and additionally performing collation of the image data, in which the object type Ku has been detected, with the object condition Cd, after accepting additional registrations of the object type Kd and the object condition Cd.

* * * * *